United States Patent [19]
Schmitschek et al.

[11] 3,779,939
[45] Dec. 18, 1973

[54] LIQUID LASER SOLUTION FORMED WITH A NEODYMIUM SALT IN PHOSPHORUS OXYCHLORIDE

[75] Inventors: Erhard J. Schmitschek, Munich, Germany; John A. Trias, La Mesa, Calif.

[73] Assignee: The United States of America as represented by the Secretary of the Navy, Washington, D.C.

[22] Filed: Jan. 29, 1971

[21] Appl. No.: 111,128

[52] U.S. Cl. .......................................... 252/301.4 P
[51] Int. Cl. ........................... C09k 1/36, C09k 1/62
[58] Field of Search ............... 252/301.4 P, 301.3 R

[56] References Cited
UNITED STATES PATENTS
3,558,504    1/1971    Brecher et al. ............... 252/301.4 P OTHER PUBLICATIONS
Schimitschek – Laser Emission of a Neodymium Salt Dissolved in $POCL_3$–Journal of Applied Physics Vol. 39, No. 14 December 1968 page 6, 120 Copy in Patent Office Search Center Primary Examiner—Oscar R. Vertiz
Assistant Examiner—J. Cooper
Attorney—R. S. Sciascia, G. J. Rubens and J. W. McLaren

[57] ABSTRACT

An improved liquid lasing solution is prepared by introducing neodymium trifluoroacetate into phosphorus oxychloride. Some Lewis acid is also desirably included in the solution in an amount to increase solubility of the neodymium III phosphorus dichloridate formed, optimize the intensity of fluorescense of the liquid lasing solution and enhance its operative efficiency. Preferably, Lewis acid of the form zirconium tetrachloride is employed and the neodymium (III) phosphorus dichloridate formed as a result of the dissolution of the neodymium trifluoroacetate in the phosphorus oxychloride is in a mole proportionality relative to the zirconium tetrachloride of not less than 1. The new liquid laser solution is highly stable over relatively long periods of time, does not degrade under flash excitation, and obviates certain undesirable absorption characteristics of comparable prior art liquid lasing compositions.

3 Claims, No Drawings

LIQUID LASER SOLUTION FORMED WITH A NEODYMIUM SALT IN PHOSPHORUS OXYCHLORIDE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The first liquid laser compositions developed had the inherent disadvantage of requiring operation at extremely low temperatures for most efficient lasing results. Following the initially developed liquid lasing compositions, improved liquid lasing solutions were devised which afforded efficient laser operation at substantially room temperatures, i.e., in the temperature range of −40°C to +30°C, as exemplified and disclosed by U. S. Pat. No. 3,360,478, issued Dec. 26, 1967 to Erhard J. Schimitschek et al.

Still more recently, improved liquid laser solutions were developed including neodymium salt dissolved in phosphorus oxychloride as disclosed by Erhard J. Schimitschek in the Journal of Applied Physics, Volume 39, No. 14, of December 1968. That publication disclosed the techniques employed and the results obtained from a liquid lasing solution developed by dissolving neodymium perchlorate and titanium tetrachloride in phosphorus oxychloride. The neodymium perchlorate dissolved in the phosphorus oxychloride produced characteristic $Nd^{3+}$ fluorescence, but the intensity was not as strong as might be expected from a solvent which has its highest vibrational frequency at $1300 cm^{-1}$. However, the fluorescense intensity was increased markedly, by approximately the order of fifty times, when small amounts of a Lewis acid, such as titanium tetrachloride, were added.

The 1968 Schimitschek disclosure in the Journal of Applied Physics, referred to herein, disclosed in part that a typical liquid laser solution may be prepared by dissolving a calculated amount of neodymium perchlorate in a 20:1 mixture (by volume) of phosphorus oxychloride and titanium tetrachloride to give a 0.1M solution. It was, however, necessary that all manipulations be carried out under a fume hood because of the highly corrosive nature of the chemicals employed.

Additionally, it was found that after several weeks of operation these liquid lasing compositions had the disadvantages of deteriorating, becoming cloudy, and also exhibiting large amounts of background absorption in the blue pump region.

SUMMARY OF THE INVENTION

The present invention comprises an improved liquid lasing composition consisting essentially of neodymium (III) phosphorus dichloridate, retained in solution with phosphorus oxychloride by the addition of a Lewis acid. Preferably the solution includes Lewis acid in sufficient amount to increase solubility, and optimize the intensity of fluorescense of the composition thereby enhancing its operative efficiency. The most desirable form of Lewis acid has been found to be zirconium tetrachloride and in a preferred form of the liquid lasing composition of the present invention, zirconium tetrachloride relative to the neodymium (III) phosphorus dichloridate formed by dissolution of the neodymium trifluoroacetate in the phosphorus oxychloride is in a mole proportionality, of not less than one.

In other words, the most desired proportionality in the new liquid lasing composition may be expressed as follows:

$[Nd(PO_2Cl_2)_3]_m \cdot [ZrCl_4]_n$ complex dissolved in $POCl_3 (n/m \geq 1)$. In a preferred form of the new liquid laser composition it has been found that the $Nd^{3+}$ concentrations are typically 1 to $2 \times 10^{20}$ ions/cm$^3$ and if the composition is kept moisture free, the solution has been found not to degrade with the passage of time nor under flash excitation conditions.

Thus, the liquid laser composition of the present invention is a significant improvement over prior, known comparable compositions. It is substantially free of deterioration due to aging or due to flash excitation. By contrast comparable prior art liquid laser solutions became cloudy with time and also exhibited undesirable absorption characteristics.

Accordingly, it is an object of the present invention to provide an efficient liquid lasing composition which is more stable than comparable prior art liquid lasing compositions.

Another most important object of the present invention is to provide a new liquid lasing solution which does not deteriorate with time nor as a result of flash excitation.

Yet another most important object of the present invention is to provide a liquid lasing solution which minimizes undesirable absorption characteristics exhibited by comparable prior art liquid lasing solutions.

These and other features, advantages, and objects of the present invention will be better appreciated from an understanding of the disclosure of a preferred form of the new liquid lasing solution which follows.

DESCRIPTION OF THE PREFERRED EMBODIMENT

The new liquid lasing solution is essentially a composition of neodymium (III) phosphorus dichloridate and zirconium tetrachloride dissolved in phosphorus oxychloride. The Nd (III) phosphorus dichloridate is most conveniently formed by introducing Nd trifluoroacetate into the phosphorus oxychloride with which it reacts and forms the Nd(III) phosphorus dichloridate. Solutions prepared in accordance with the teachings of the present invention proved to be stable over a test period of approximately 1 year and the undesirable absorption characteristics of prior art comparable solutions were essentially obviated, the pump absorption being due to $Nd^{3+}$ alone. The solvation process involved may be described as follows:

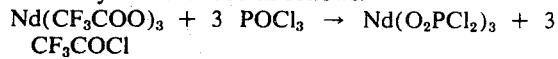
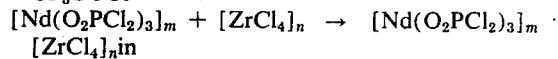

$POCl_3$ where $n/m$ is $\geq 1$.

During the lasing action, the measured fluorescense decay time was typically 325 microseconds and the quantum efficiency was 47 ± 5%. During the laser experiments a teflon pump was employed to continuously recirculate the lasing liquid through the laser cell and also through an external heat exchanger fabricated of nickel. High flow velocities were readily achieved because the viscosity of the lasing liquid was only 1.7 to 2.7 centipoise, depending on the doping level. The laser cell was made of fused quartz tube 150mm long and 7mm in diameter. With external flat mirrors 60cm apart, the dynamic losses were determined to be 0.013cm$^{-1}$. With spherical mirrors having a radius of 1.47m in the same configuration, the losses could effectively be reduced to 0.003cm$^{-1}$. The threshold energy was found to be 7 joules and the slope efficiency 0.6%. However, with rigorous exclusion of moisture in the preparation of the solution, the scattering could be further reduced and slope efficiencies comparable to Nd$^{3+}$ doped glasses are obtainable.

With flat mirrors, slightly above the threshold, clearly defined mode patterns were observed in the output. When the optical pump power was increased, the beam broke into many irregularly distributed "hot" filaments. Time resolved studies indicate that the "hot spots" change their location within the beam in less than one microsecond. The measured beam divergence of the output beam with flat mirrors was $1.2 \times 10^{-3}$ radians. This is about seven times defraction limited if related to the 7mm large aperture of the laser cell. It becomes defraction limited if related to the average size of the filaments which were between 0.5 and 1mm.

In the frequency domain, the output consisted of one single line at 1.054 microns. Excitation spectra of the laser solution taken at different temperatures down to that of liquid helium clearly show that the fluorescing Nd-complex is present in solution in at least three different species. The fact that still only one laser output line can be observed suggests a fast enough cross-relaxation among the species to give the appearance of a homogeneously broadened line.

Stimulated Raman emission emerging simultaneously with the main laser emission could be observed only when the laser was passively mode-locked. The Stoke-shifted Raman line occurred at 488cm$^{-1}$ in very good agreement with one of the Raman-active stretching vibrations of POCl$_3$ at 483cm$^{-1}$. Extensive experimentation demonstrated that repetition frequencies of 5pps could readily be achieved with several megawatts peak output power (actively Q-switched) and construction of a larger system could reasonably be expected to significantly increase the power output.

Thus, the liquid lasing composition of the present invention obviates several disadvantages of comparable prior art liquid lasing solutions. Most significantly, the new liquid lasing composition has proven to be highly stable and not subject to becoming cloudy, either due to the passage of time or due to flash excitation during the lasing process.

Moreover, the new liquid lasing solution in addition to being capable of producing highly desirable laser emission, has proven to have substantially eliminated the highly undesirable large background absorption in the blue pump region that was characteristic of neodymium perchlorate and titantium tetrachloride dissolved in phosphorus oxychloride, one of the typical comparable prior art liquid laser solutions.

Obviously many modifications and variations of the present invention are possible in the light of the above teachings. It is therefore to be understood that within the scope of the appended claims the invention may be practiced otherwise than as specifically described.

What is claimed is:

1. A liquid lasing solution consisting essentially of neodymium (III) phosphorus dichloridate and zirconium tetrachloride dissolved in phosphorus oxychloride, wherein said zirconium tetrachloride is in an amount to optimize the solubility and fluorescence of the neodymium (III) phosphorus dichloridate.

2. A liquid lasing solution as claimed in claim 1 wherein said zirconium tetrachloride is in a mole proportionality relative to said neodymium (III) phosphorus dichloridate of not less than one.

3. A liquid lasing solution as claimed in claim 1 wherein the neodymium (III)-phosphorus dichloridate is formed by dissolution of neodymium trifluoroacetate in phosphorus oxychloride.

* * * * *

UNITED STATES PATENT OFFICE
CERTIFICATE OF CORRECTION

Patent No. 3,779,939        Dated  December 18, 1973

Inventor(s)  ERHARD J. SCHIMITSCHEK, ET. AL.

It is certified that error appears in the above-identified patent and that said Letters Patent are hereby corrected as shown below:

On the cover sheet [19], "Schmitschek" should read -- Schimitschek -- ; Also on the cover sheet [75], "Schmitschek" should read -- Schimitschek -- .

Signed and sealed this 13th day of August 1974.

(SEAL)
Attest:

McCOY M. GIBSON, JR.                C. MARSHALL DANN
Attesting Officer                   Commissioner of Patents